(12) United States Patent
Kumar

(10) Patent No.: US 8,036,707 B2
(45) Date of Patent: Oct. 11, 2011

(54) METHOD AND SYSTEM FOR TRACKING MOBILE COMMUNICATION DEVICE USING INSTANT MESSAGING

(75) Inventor: Ashish Kumar, Bangalore Karnataka (IN)

(73) Assignee: Samsung Electronics Co., Ltd (KR)

( * ) Notice: Subject to any disclaimer, the term of this patent is extended or adjusted under 35 U.S.C. 154(b) by 1032 days.

(21) Appl. No.: 11/901,191

(22) Filed: Sep. 15, 2007

(65) Prior Publication Data

US 2008/0070631 A1  Mar. 20, 2008

(30) Foreign Application Priority Data

Sep. 14, 2006  (IN) ............................ 1678/CHE/2006
Jul. 10, 2007  (KR) ........................ 10-2007-0069266

(51) Int. Cl.
*H04B 1/38* (2006.01)
*H04M 3/16* (2006.01)
*H04W 4/00* (2009.01)
*H04W 24/00* (2009.01)

(52) U.S. Cl. ...... 455/558; 455/411; 455/466; 455/456.1

(58) Field of Classification Search .................. 455/558
See application file for complete search history.

(56) References Cited

U.S. PATENT DOCUMENTS

| | | | |
|---|---|---|---|
| 6,662,023 B1* | 12/2003 | Helle | 455/558 |
| 2006/0025177 A1* | 2/2006 | Tu | 455/558 |
| 2006/0079210 A1 | 4/2006 | Fujibayashi | |
| 2006/0276175 A1* | 12/2006 | Chandran | 455/411 |
| 2007/0082705 A1 | 4/2007 | Jain et al. | |
| 2008/0293397 A1* | 11/2008 | Gajdos et al. | 455/420 |

* cited by examiner

*Primary Examiner* — Pierre-Louis Desir
*Assistant Examiner* — Timothy Pham
(74) *Attorney, Agent, or Firm* — The Farrell Law Firm, P.C.

(57) ABSTRACT

Provided is a method for tracking any mobile electronic device which accesses wireless or wired network using Instant Messaging (IM). The mobile device, capable of instant messenger (IM) functionality, allows storage of one or more IM IDs in a separate non-volatile memory. When the mobile device is lost/stolen, and another person changes the SIM card, the phone verifies if the SIM card is the same as that of the owner by matching the IMSI numbers of the two. If there is a mismatch, the mobile device triggers the tracking feature. The tracking feature automatically and stealthily transmits instant messages to the stored messenger IDs. Furthermore, with video/voice capability in the IM client, there is a provision for transmitting live video/voice of the person using the mobile phone after the tracking feature is enabled as video calls or voice calls respectively.

21 Claims, 5 Drawing Sheets

METHOD AND SYSTEM FOR TRACKING MOBILE COMMUNICATION DEVICE USING INSTANT MESSAGING

PRIORITY

This application claims priority under 35 U.S.C. §119(a) to Patent Applications filed in the India Patent Office on Sep. 14, 2006 and assigned Serial No. 1678/CHE/2006, and filed in the Korean Intellectual Property Office on Jul. 10, 2007 and assigned Serial No. 2007-69266, the contents of which are hereby incorporated by reference.

BACKGROUND OF THE INVENTION

1. Field of the Invention

The present invention generally relates to communication technology, specifically to user equipment/mobile communication devices. In particular, this invention relates to the security of mobile communication devices, and a method for tracking a mobile communication device using Instant Messaging.

2. Description of the Related Art

The existing art involves tracking of mobile phones by a method with which it detects possible misuse when the phone is stolen and a SIM (Subscriber Identity Module)/USIM (User Services Identity Module) has been replaced, and reports it by itself to the actual owner through SMS (Short Message Service) or email, without the network making queries.

Figure 1:
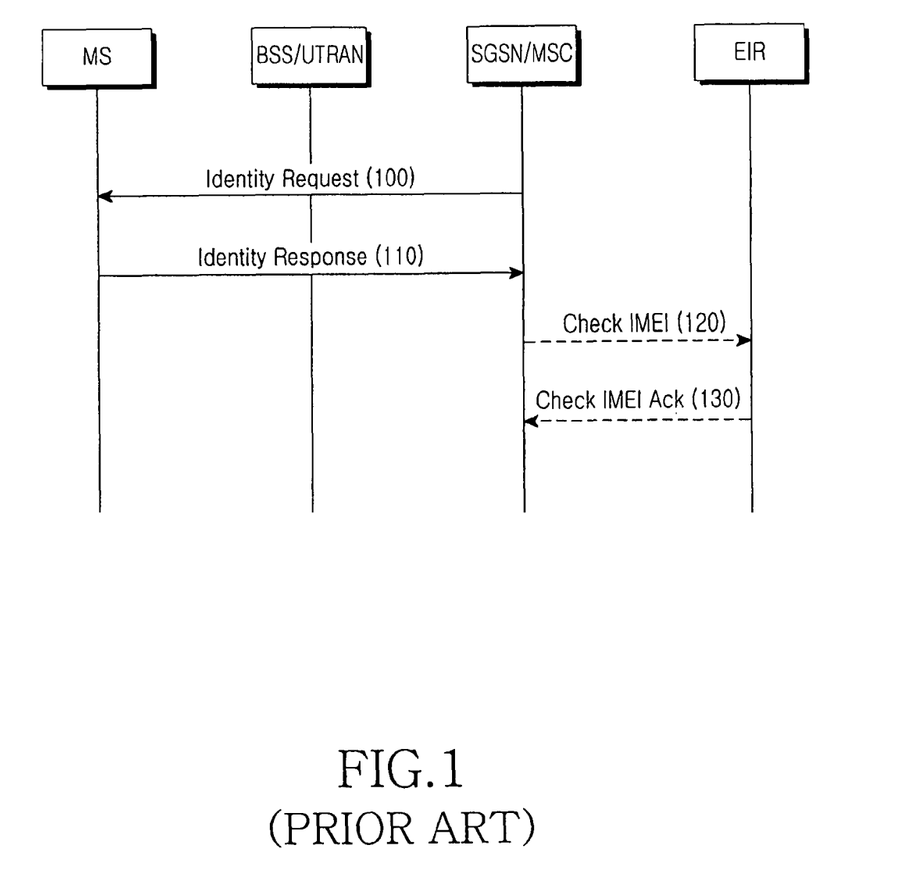
FIG. 1 illustrates a signal flow for a user Identity Check procedure of a conventional mobile communication device.

Referring to FIG. 1, FIG. 1 shows an identity check procedure used in the prior art. In step 100, a SGSN (Serving GPRS Support Node) or an MSC (Mobile Switching Centre) sends an Identity Request to an MS (Mobile station), and in response to the Identity Request, the MS sends an Identity Response (Mobile Identity) in step 110. Here, the Identity Request may be to request an Identity Type. If the SGSN or MSC decides to check the International Mobile Equipment Identity (IMEI) against the EIR (Equipment Identity Register), it sends a Check IMEI to the EIR in step 120. In step 130, the EIR sends a Check IMEI Ack to the SGSN/MSC in response to the Check IMEI.

US Patent Publication No. 2006/0079210 A1 discloses "Message Automatic Notification System, Message Automatic Notification Method, Communication Terminal Device, And Recording Medium," in which a message automatic notification system sends a message via a communication network to other communication terminal devices registered in a communication terminal device. The communication terminal device includes a control circuit, a communication circuit, and a memory unit. The control circuit causes a message-sending condition to be registered in the memory unit, and obtains presence information from the other communication terminal device registered in the memory unit via the communication network. Thereafter, the control circuit determines whether the message-sending condition where a message is sent when the presence information turns out to be a predetermined state which is established based on the presence information obtained, and sends a message previously registered by a user in the memory unit when it is determined that the message-sending condition is established. However, this Publication does not discuss sending notification when a SIM card has been replaced.

SUMMARY OF THE INVENTION

An aspect of the present invention is to substantially solve the above problems and/or disadvantages and to provide at least the advantages below. Accordingly, an aspect of the present invention is to provide a system and method for tracking a mobile communication device using an IM without the network making queries.

Another aspect of the present invention is to provide a method for tracking a mobile communication device without any extra effort from the user/operator to track it.

A further aspect of the present invention is to provide a method which does not depend on the presence of an EIR in the network, providing an efficient and fast way of tracking, compared to the network querying the IMEI of all users which still does not guarantee any results.

A further aspect of the present invention is to provide transparency to a new user thereby allowing the new user to contact with an original user from the original user information displayed in the device when the SIM/USIM card has been replaced.

The above aspects are achieved automatically sending instant messages to a preset destination whenever the SIM/USIM card has been replaced or is powered up with a different Network card from that of the original user who activated the tracking feature, provided the tracking feature in the device is turned on. The Mobile Station checks whether the SIM in the device has been replaced. Whenever it finds such replacement, it initiates the instant messaging application (in the background) and connects to a server for sending information about new user secretly to the preset address (The original user is capable of configuring these parameters). This information will be sent to the Instant Messaging (IM) ID stored in the phone (by the Original user) using Instant Messaging systems. The only assumption is that Mobile Station would be able to send the IM message over SMS or Data Bearer. Mobile Station can also trigger live voice or video call to the stored IM ID at regular intervals. The present invention provides a method to track the stolen devices with no extra functionality at the network side or IM server side. This method is really handy because more and more devices are equipped with an IM application and IM is gaining popularity day by day.

Accordingly, this invention provides a method for tracking any mobile communication device using Instant Messaging (IM) by making the device automatically send instant messages to a predefined IM user whenever the SIM/USIM card has been replaced or the device is powered up with a different SIM/USIM card.

According to one aspect of the present application, the information sent to the predefined IM user by the device after initiating the IM application in the background includes a New Subscriber's number International Mobile Subscriber Identity (IMSI), a New Subscriber's Location, a New Subscriber's Live voice and a New Subscriber's Live video. The device provides a menu option with password (Tracking Control Key) protection. The Tracking Control Key is used to turn on/off the tracking feature and to edit the destination email-id/phone. The Tracking Control Key is also used to edit a user-defined part of the message contents for sending the IM message. The Tracking Control Key is further used for the configuration of Voice and Video calls, and Location's information periodicity. When the user tries to activate the tracking feature, the user is prompted for the Tracking Control Key. The user is prompted for the alert-message destination and optionally the customizable contents of an alert message when the Tracking Control gets activated. If the user wishes to access/change the alert-message destination and the customizable contents, the user has to input the Tracking Control Key: In the IM message, the Location Information, Mobile Station International Subscriber Directory Number (MSISDN)/IMSI of the current user can be included, in addition to any user-defined text. The device places voice and video calls to a defined user at periodic intervals. The user-authentication info for accessing the IM reporting feature, the destination IM ID, and any predefined text to be sent is stored in an Nonvolatile Random Access Memory (NVRAM). When the tracking feature gets activated for a device supporting SIM/USIM card, the IMSI of the current SIM/USIM card is stored in the NVRAM, where if there is no SIM/USIM card, user is prompted to insert a SIM/USIM card. Once the Tracking Control feature is successfully activated, whenever a new SIM card is inserted, the device compares the IMSI stored in the NVRAM with the new IMSI and if there is a mismatch, sends an IM message to the destination which was specified by the owner. The current Location information of the device, if it is available, can be included in the IM message. If the initial attempt to send the IM message fails, the device keeps trying periodically until successful. The period can be adjusted.

Accordingly, this invention provides a system for tracking any mobile electronic device using an IM by making the device automatically send instant messages to a predefined IM user whenever a SIM/USIM card has been changed or the device has been powered up with a different SIM/USIM card. The system includes a Tracking Control Key authentication module which handles activation/deactivation of Tracking Control and accesses the customized information to be sent in the message. The system includes a customization module which maintains the message format and content information. The system includes a SIM/USIM Info access module which gets the required info from the SIM/USIM, and detects the change of the SIM/USIM card. The system includes a Location Info Access module which gets the information about the current location of the device, if the user has opted for it to be sent in the alert message. The system includes a Call Barring Status Check module, which periodically checks whether the status is changed, for sending the alert message if the outgoing call has barred. The system includes an Info Display module which displays the current settings. The system includes a Network-access check module which triggers the alert SMS for devices which don't use a SIM card, when the device is connected to a network. The system includes a camera module for taking pictures or a Video Clip when a new SIM Card is inserted, as part of the MMS (Multimedia Messaging Service) message to be sent to a pre-defined destination. The system includes an Instant Messaging module which has an Instant Messaging application which can connect with IM server using SMS and Data Bearers.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Preferred embodiments of the present invention will be described herein below with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention provides a method to track the Mobile Equipment (ME) by making the ME detect possible misuse (when the phone is stolen and a SIM/USIM card is replaced, or if the device is not a phone, when the device accesses a network), and report it by itself to the actual owner, without the network making queries.

Figure 2:
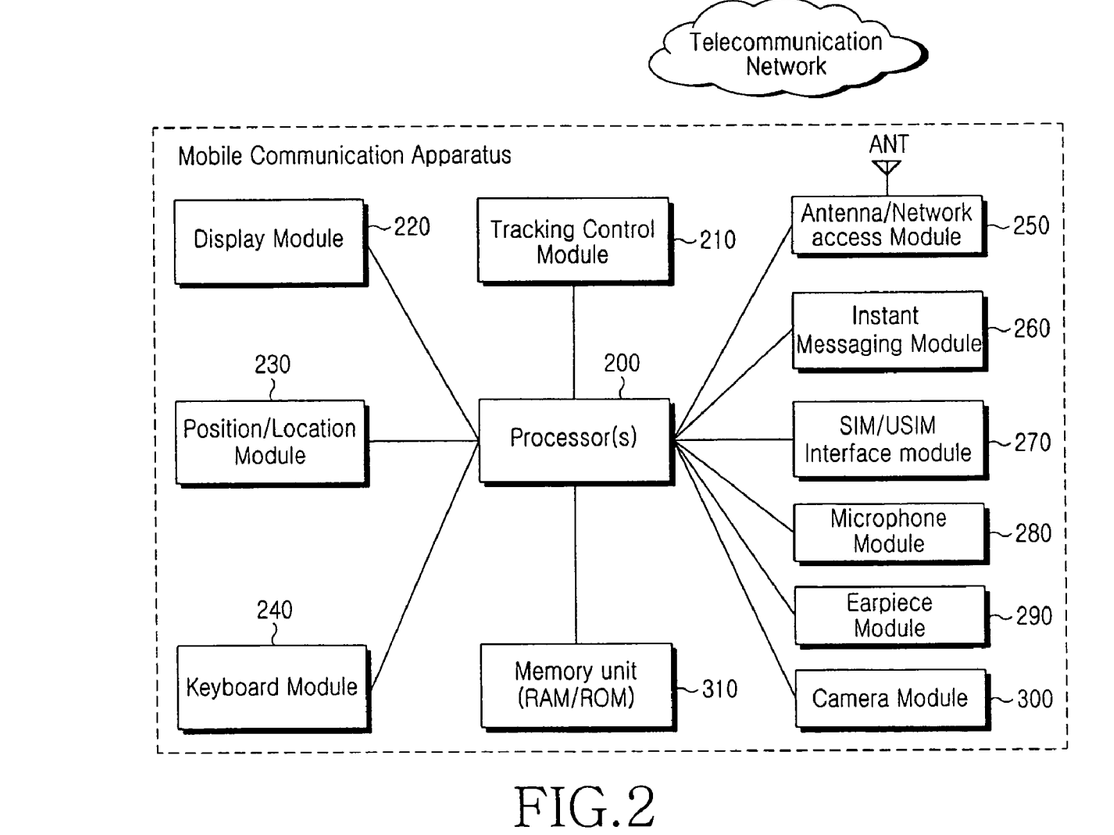
FIG. 2 is an inner block diagram of a mobile communication device according to an embodiment of the present invention, which is operable to automatically send an IM when a user is not authenticated.

FIG. 2 shows the mobile electronic device according to an embodiment of the present invention, for use in connection with a telecommunication network. The main focus of the invention relates to the operation of the Tracking Control feature, and a configuration for performing the Tracking Control feature is given in FIG. 3.

Referring to FIG. 2, a Processor 200, which is connected to a Tracking Control Module 210, controls operations of a Display module 220, a Position/Location Module 230, a Keyboard Module 240, a Memory Unit 310, an Antenna/Network Access Module 250, an Instant Messaging Module 260, a SIM/USIM Interface Module 270, a Microphone Module 280, an Earpiece Module 290, and a Camera Module 300 according to a control of the Tracking Control Module 210.

The Display Module 220 displays input data, and the Position/Location Module 230 is a positioning module, such as GPS, determining the location of the mobile communication device according to the Tracking Control Module 210. Also, the Keyboard Module 240 has a plurality of keys and generates and outputs key signals corresponding to the keys.

The Memory Unit 310 includes a ROM (Read Only Memory), a RAM (Random Access Memory), etc., for storing a plurality of programs and data for the Tracking Control Module 210 which activates according to the present invention when access of any non-authenticated user is detected. Especially, the Memory Unit 310 according to the embodiment of the present invention stores contents of the alert messages and destination information, such as phone numbers of destination mobile phones and E-mail IDs, to which the alert message is to be sent. Here, the destination information is either one destination or a plurality of destinations.

The Antenna/Network Access Module 250 receives signals generated from the Processor 200, performs digital radio modulation on the received signals, and transmits the digital radio modulation signals. Also, the Antenna/Network Access Module 250 demodulates signals received via the antenna and transfers the demodulated signals to the Processor 200. Also, the Instant Messaging Module 260 has an instant messaging application capable of accessing the IM server over the data bearer so as to receive the signals generated from the Processor 200 and create an IM (Instant Message). The SIM/USIM Interface Module 270 is an interface for connecting the SIM/USIM card inserted into the mobile communication device with the mobile communication device. The Microphone Module 280 processes voice signals input through a microphone and outputs the processed signals. The Earpiece Module 290 processes input signals into audible sounds and then outputs the audible sounds.

The Camera Module 300 according to the present invention as shown in FIG. 2, which has a camera function, is a module operable to take photographs or record a video clip of a non-authenticated user which is included in the MMS which is to be sent to the predefined destination mobile communication device. The Camera Module 300 takes photographs or records the non-authenticated user if the non-authenticated user attempts access when the subscriber's number of a new SIM is checked whenever a new SIM is inserted into the mobile communication device.

Also, the Tracking Control Module 210 controls the Tracking Control operation according to the embodiment of the present invention, wherein the main features of the Tracking Control operation are given below.

Figure 3:
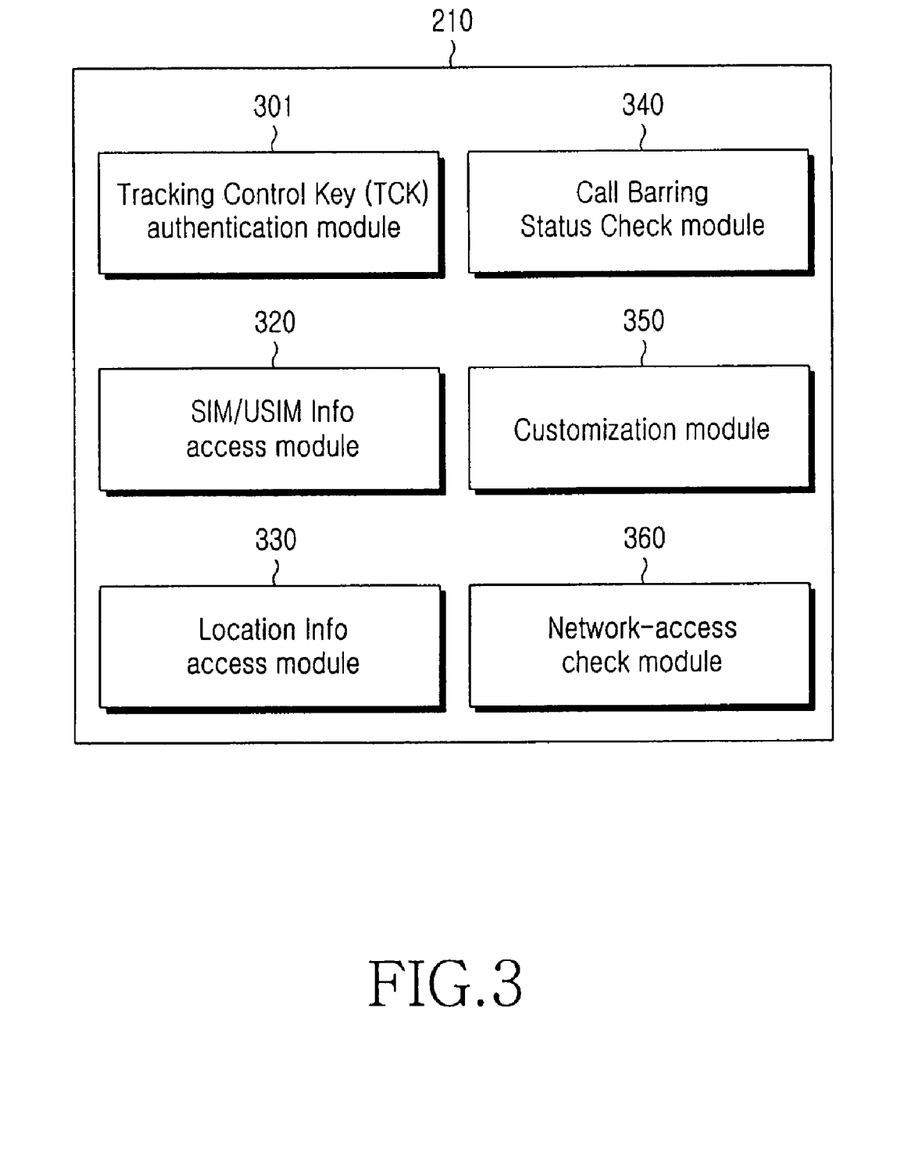
FIG. 3 is a detailed inner block diagram of the tracking control module of the mobile communication device shown in FIG. 2.

1. Whenever the SIM/USIM card has been changed or the device has been powered up with a different SIM/USIM card, the device automatically sends Instant messages to preset destination mobile communication devices. The Tracking Control Module 210 initiates the IM application (in the background) secretly to send following information to the users of destination mobile communication devices:
  1) New Subscriber's number (IMSI: International Mobile Subscriber Identity)
  2) New Subscriber's Location
  3) New Subscriber's Live voice
  4) New Subscriber's Live video 2. The Tracking Control Module 210 provides a menu option with a password such as TCK (Tracking Control Key) protection:
  1) to turn on/off this feature
  2) for editing the destination email-id/phone number of the destination mobile communication device
  3) for editing the user-defined part of the message contents for sending the IM
  4) configuration for Voice and Video calls with periodicity
  5) configuration for Location's information periodicity The Tracking Control Module 210 includes, as shown in FIG. 3, a sub-module. Referring to FIG. 3, a TCK authentication module 301 handles activation/deactivation of the Tracking Control, and accesses the customization of the information to be sent in the message. A Customization module 350 maintains the message format and content information. A SIM/USIM Info access module 320 gets the required info from the SIM/USIM card, like IMSI and Call barring status, etc., and detects the change of the SIM/USIM card. A Location Info Access module 330 gets the information about the current location information of the device from the Position/Location Module 230 in FIG. 2, if the user has opted for it to be sent in the alert message. A Call Barring Status Check module 340, if the outgoing call is barred, periodically checks whether the status is changed, for sending the alert message. A Network-access check module 360, for devices which do not use a SIM card, triggers the alert SMS when the device is connected to a network.

Then, if the user is not authenticated in the mobile communication device including the Tracking Control Module 210 having the sub-modules as shown in FIG. 3, the configuration and activation of the Tracking control mode 210 is performed in order to send, automatically (in the background), an IM to the predefined destinations without recognition by the non-authenticated user. The procedure of the configuration and activation of the Tracking Control mode will be described with reference to FIG. 4.

Figure 4:
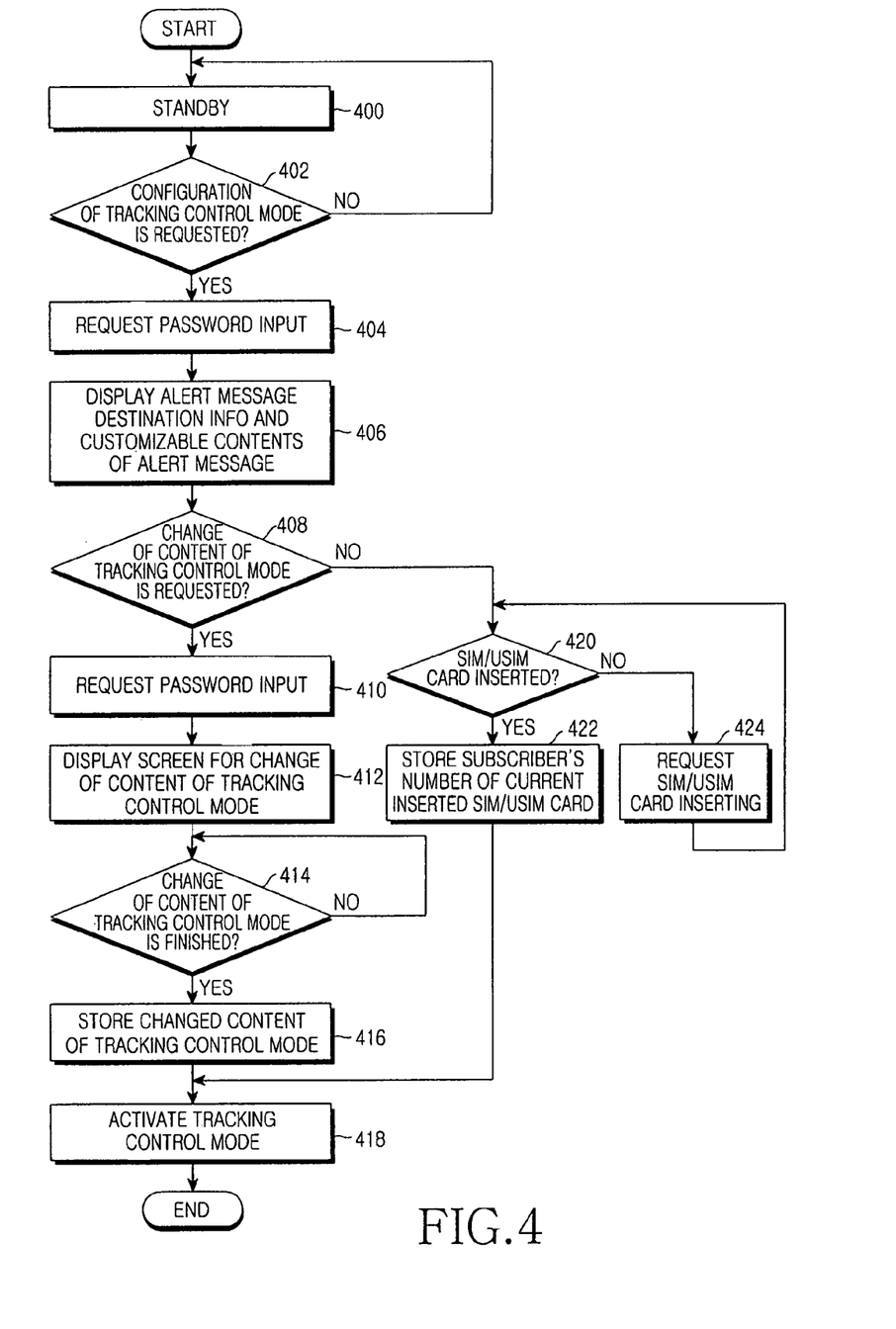
FIG. 4 is a control flow chart illustrating a procedure for activating a tracking control mode in a mobile communication device according to an embodiment of the present invention.

At first, the Tracking Control Module 210 is in standby state, as shown in step 400. When the user requests configuration of the Tracking Control mode in step 402, the Tracking Control Module 210 requests the user to input a password, such as the TCK in step 404. Thereafter, when the correct password is input, the user is prompted for the alert-message destination information and optionally the customizable contents of the alert message in step 406. Then, the Tracking Control Module 210 checks whether there is a request for the change of the contents of the Tracking Control mode, and if the request for the change does not exist, the Tracking Control Module 210 proceeds to step 420.

In step 420, the Tracking Control Module 210 checks whether SIM/USIM card is being inserted. If the SIM/USIM card is being inserted, the Tracking Control Module 210 stores the IMSI of the current SIM/USIM card in the Memory Unit 310 in step 422 and proceeds to step 418. If the SIM/USIM card is not inserted in step 420, the Tracking Control Module 210 requests the user to insert the SIM/USIM card in step 424. When the SIM/USIM card is inserted, the Tracking Control Module 210, like in step 422, stores the IMSI of the current SIM/USIM card in the Memory Unit 310 and proceeds to step 418. Namely, the Tracking Control mode is activated through steps 400 and 408, and steps 420, 422, 424, and 418.

However, if the user requests a change of the contents of the Tracking Control mode in step 408, the contents of the Tracking Control mode can be changed through steps 410 to 418. After proceeding from step 408, the Tracking Control Module 210 requests the user to input the password in step 410. If the correct password is input, the Tracking Control Module 210 displays a screen for the change of the contents of the Tracking Control Mode. At this time, the IM, which is automatically sent when a non-authenticated user attempts to use the mobile communication device, can include the Location Information, MSISDN/IMSI, etc., of the current user, in addition to any user-defined text. Also, the Tracking Control Module 210 may make voice and video calls to the defined user at periodic intervals.

Also, the user-authentication info for accessing the IM reporting feature, the destination IM ID, and any predefined text to be sent is stored in the Memory Unit 310. Here, the destination IM ID is either one ID or a plurality of IDs.

In step 414, the Tracking Control Module 210 checks whether the change of the contents of the Tracking Control Mode is finished, and if it is finished, proceeds to step 416. In step 416, the Tracking Control Module 210 stores the changed contents of the Tracking Control mode in the Memory Unit 310 and then proceeds step 418. In step 418, the Tracking Control Module 210 activates the Tracking Control mode.

Figure 5:
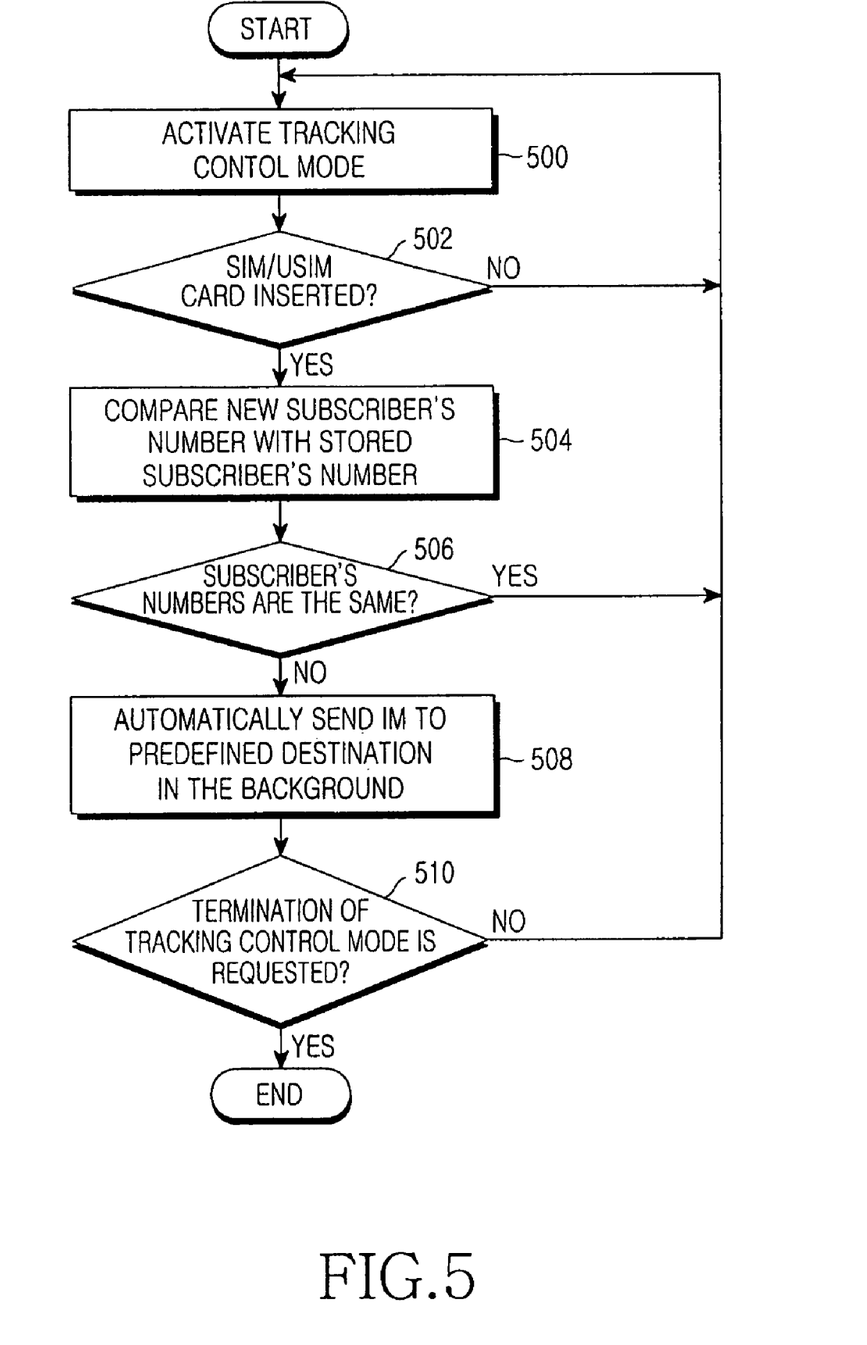
FIG. 5 is a control flow chart illustrating a procedure for automatically sending an IM when a user is not authenticated in a mobile communication device according to an embodiment of the present invention.

Then, a procedure for automatically sending the alert-message if a non-authenticated SIM/USIM card is inserted into the mobile communication device while the Tracking Control mode is being activated, will be explained with reference to FIG. 5.

After the activation of the Tracking Control Mode in step 500, the Tracking Control Module 210 checks whether the SIM/USIM card is inserted into the mobile communication device in step 502. If it detects any insertion of SIM/USIM card, the Tracking Control Module 210 compares the stored subscriber's number with new subscriber's number in step 504.

In step 506, if the compared subscriber's numbers are the same as each other, the Tracking Control Module 210 returns to step 500 and maintains the Tracking Control Mode. If the subscriber's numbers compared in step 506 are not the same as each other, the Tracking Control Module 210 automatically (in the background) sends the pre-stored IM to corresponding destinations based on the predefined destination information. Here, the destination is either phone numbers of mobile communication devices or E-mail addresses of predefined destinations. Also, the IM to be sent includes the current location information and the new subscriber's number of the mobile communication device, and live voice and live video data of new subscriber. If the initial attempt to send the IM fails, the mobile communication device keeps trying periodically until successful. Here, the period can be selectively configured.

Thereafter, the Tracking Control Module 210 checks whether there is a request for terminating the Tracking Control Mode. If there is the request for termination, the Tracking Control Module 210 terminates the Tracking Control Mode, and, if not, returns to step 500 and maintains the Tracking Control Mode. Here, the Tracking Control Module 210 may request the password for the user-authentication also when there is the termination request, and, if the correct password is input, terminates the current Tracking Control Mode.

According to the present invention as described above, the mobile communication device identifies whether a SIM card is the same as that of the owner of the device by comparing the pre-stored subscriber's number with a subscriber's number of the changed SIM card. If there is a mismatch in the comparison, the mobile communication device initiates the Tracking Control Mode. The Tracking Control Mode automatically sends the pre-stored IM to the predefined destinations. Furthermore, if the mobile communication device has the video/voice functions, the mobile communication device in the Tracking Control Mode may further send a video clip/voice of the non-authenticated user as a video call or a voice call, respectively.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

As described above, the present invention enables tracking a stolen mobile communication device by automatically sending an IM to predefined destinations whenever the SIM/USIM card has been replaced or powered up with a different SIM/USIM card.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart therefrom.

What is claimed is:

1. A method for tracking a mobile communication device having an IM function, comprising the steps of:
   activating selectively a tracking control mode if there is a request for configuring the tracking control mode to perform a function enabling tracking of the mobile communication device;
   checking under the activated tracking control mode whether a SIM (Subscriber Identity Module)/USIM (User Services Identity Module) card has been changed; and
   automatically sending an IM (instant message) to a predefined destination mobile communication device in the background when a non-authenticated SIM/USIM card has been detected, wherein the IM includes at least one of a Subscriber's Live voice data, image data and video data of the current user; and at least one of a pre-stored user defined text, current location information of the mobile communication device, a subscriber's number of a current user, corresponding to the current non-authenticated SIM/USIM card.

2. The method for tracking a mobile communication device having an IM function as claimed in claim 1, wherein the IM further includes the Subscriber's number (IMSI), a current location of the mobile communication device and the Subscriber's Location, corresponding to the current non-authenticated SIM/USIM card.

3. The method for tracking a mobile communication device having an IM function as claimed in claim 1, further comprising providing a menu option with a predefined password after the tracking control mode is activated.

4. The method for tracking a mobile communication device having an IM function as claimed in claim 3, further comprising:
   requesting input of a password according to a request for editing at least one of turn on/off information of the tracking control mode, a user-defined part of the message and destination information; and
   performing an operation enabling the edit if an input password is the same as a pre-stored password.

5. The method for tracking a mobile communication device having an IM function as claimed in claim 3, further comprising:
   requesting the input of a password according to a request for editing the user-defined part of the message; and
   performing an operation enabling the edit if a password is input and the input password is the same as a pre-stored password.

6. The method for tracking a mobile communication device having an IM function as claimed in claim 3, further comprising:
   requesting input of a password according to a request for configuration for voice and video calls and configuration for location information; and
   performing an operation enabling the edit if an input password is the same as a pre-stored password.

7. The method for tracking a mobile communication device having an IM function as claimed in claim 1, further comprising requesting the input of a password when there is a request for configuration for the tracking control mode.

8. The method for tracking a mobile communication device having an IM function as claimed in claim 7, further comprising displaying IM destinations and customizable contents of the IM if an input password is the same as a pre-stored password.

9. The method for tracking a mobile communication device having an IM function as claimed in claim 8, further comprising:
   requesting the input of a password if a request for accessing or changing the IM destination and the customizable contents of the IM is generated; and
   performing an operation enabling the change if an input password is the same as the pre-stored password.

10. The method for tracking a mobile communication device having an IM function as claimed in claim 8, further comprising:
   checking whether a SIM/USIM card is being inserted;
   storing, when a SIM/USIM card is being inserted, a subscriber's number of the inserted SIM/USIM card, and requesting, when the SIM/USIM card is not inserted, to insert the SIM/USIM card; and
   storing, after the SIM/USIM card is inserted, a subscriber's number of the inserted SIM/USIM card.

11. The method for tracking a mobile communication device having an IM function as claimed in claim 1, further comprising making a voice call or video call to predefined destination mobile communication device at a predefined periodic interval.

12. The method for tracking a mobile communication device having an IM function as claimed in claim 1, further comprising continuing to send, if the sending of the IM fails, the IM in a predefined period until successful.

13. A system for tracking a mobile communication device having an IM function, comprising:
   a source mobile communication device activating selectively a tracking control mode if there is a request for configuring the tracking control mode to perform a function enabling tracking the mobile communication device, checking under the current activated tracking control mode whether a SIM (Subscriber Identity Module)/USIM (User Services Identity Module) card has been changed, and automatically sending an IM (instant messages) to a predefined destination mobile communication device in the background when a non-authenticated SIM/USIM card has been detected; wherein the IM includes at least one of Subscriber's Live voice data, image data and video data of the current user; and at least one of a pre-stored user defined text, current location information of the mobile communication device, a subscriber's number of a current user, corresponding to the current non-authenticated SIM/USIM card; and
   a destination mobile communication device receiving the IM, the source mobile communication device makes one of a Subscriber's Live voice call and the Subscriber's Live video call corresponding to the current non-authenticated SIM/USIM card to predefined destination mobile communication device at a predefined periodic interval.

14. The system for tracking a mobile communication device having an IM function as claimed in claim 13, wherein the source mobile communication device comprises a tracking control key authentication module handling activation/deactivation of the tracking control mode and accessing customized information to be sent in the IM.

15. The system for tracking a mobile communication device having an IM function as claimed in claim 13, wherein the source mobile communication device comprises a customization module operable to maintain the IM format and content information.

16. The system for tracking a mobile communication device having an IM function as claimed in claim 13, wherein the source mobile communication device comprises a SIM/USIM information access module operable to detect the change of the SIM/USIM card.

17. The system for tracking a mobile communication device having an IM function as claimed in claim 13, wherein the source mobile communication device comprises a location information access module operable to get information about the current location of the source mobile communication device if the IM is configured to include location information.

18. The system for tracking a mobile communication device having an IM function as claimed in claim 13, wherein the source mobile communication device comprises a camera module for photographing pictures or video clips if the IM is configured to include picture or video data of the current user.

19. The system for tracking a mobile communication device having an IM function as claimed in claim 13, wherein the source mobile communication device comprises a call barring status check module operable to check in a predefined period whether the call barring status is changed, for sending a pre-stored IM if an outgoing call is barred.

20. The system for tracking a mobile communication device having an IM function as claimed in claim 13, wherein the source mobile communication device comprises a network-access check module operable to trigger a predefined alert message when the mobile communication device is connected to a network.

21. The system for tracking a mobile communication device having an IM function as claimed in claim 13, wherein the source mobile communication device comprises an instant messaging module which has an instant Messaging application which can connect with IM server using SMS (Short Message Service) and Data Bearers.

* * * * *